US010162979B2

(12) United States Patent
Barrilleaux et al.

(10) Patent No.: US 10,162,979 B2
(45) Date of Patent: *Dec. 25, 2018

(54) DISCOVERING AVAILABILITY OF DIGITAL MEDIA FROM MULTIPLE SOURCES

(71) Applicant: Amazon Technologies, Inc., Seattle, WA (US)

(72) Inventors: Brett C. Barrilleaux, Seattle, WA (US); Ann M. Groeninger, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/727,657

(22) Filed: Oct. 9, 2017

(65) Prior Publication Data
US 2018/0032751 A1 Feb. 1, 2018

Related U.S. Application Data

(63) Continuation of application No. 13/292,138, filed on Nov. 9, 2011, now Pat. No. 9,817,986.

(51) Int. Cl.
G06F 21/62 (2013.01)
G06F 21/10 (2013.01)
(52) U.S. Cl.
CPC .......... G06F 21/6218 (2013.01); G06F 21/10 (2013.01)

(58) Field of Classification Search
CPC ................................................. G06F 17/30017
See application file for complete search history.

(56) References Cited

U.S. PATENT DOCUMENTS

| 8,689,269 | B2* | 4/2014 | Yellin | H04N 21/251 709/231 |
| 2010/0076983 | A1 | 3/2010 | Gates et al. | |
| 2011/0093329 | A1 | 4/2011 | Bodor et al. | |
| 2011/0126236 | A1* | 5/2011 | Arrasvuori | H04N 21/4532 725/46 |
| 2012/0078830 | A1* | 3/2012 | Bodor | G06F 17/30017 706/46 |
| 2012/0245918 | A1 | 9/2012 | Overton et al. | |

* cited by examiner

Primary Examiner — Mariela Reyes
Assistant Examiner — Courtney Harmon
(74) Attorney, Agent, or Firm — Thomas | Horstemeyer, LLP

(57) ABSTRACT

Disclosed are various embodiments for discovering availability of digital media titles from multiple digital media service providers. A user account can indicate a relationship with one or more of the digital media service providers. For selected digital media service providers, availability of the digital media title for viewing by the user account can be determined. Relationship information for the user account can be retrieved to determine if a specified digital media title is available for viewing from a digital media service provider. The information about accessibility of the specified digital media title can be prepared and sent to a client device.

20 Claims, 5 Drawing Sheets

DISCOVERING AVAILABILITY OF DIGITAL MEDIA FROM MULTIPLE SOURCES

CROSS-REFERENCE TO RELATED APPLICATION

This application is a continuation of U.S. Ser. No. 13/292,138, filed on Nov. 9, 2011 and entitled "DISCOVERING AVAILABILITY OF DIGITAL MEDIA FROM MULTIPLE SOURCES," which is incorporated herein in its entirety.

BACKGROUND

Users can purchase, access, view, and otherwise consume digital media content without waiting for a physical good to be delivered, since digital media is instead transferred in digital form. Users may have a variety of options for purchasing or renting digital media content, from a variety of digital media service providers.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The various embodiments described herein relate to accessing media content that is available, in digital form, from digital media service providers. Various embodiments disclosed herein first obtain information about which digital media service providers a particular user has a relationship with, and about the features associated with that relationship. This user-provider information is used to discover whether a digital media title of interest to the user is available from one or more of this selected set of digital media service providers. The user is then presented with a consolidated view of the availability of the title from these digital media service providers. The view may also provide details about the user's access to the title, taking into account the features associated with the relationship. For example, the consolidated view may include a price and a media format for each of the subset of digital media service providers through which the title of interest is available. By providing a single view that includes this entire subset of digital media service providers, various embodiments disclosed herein improve the user experience when shopping for digital media. In the following discussion, a general description of the system and its components is provided, followed by a discussion of the operation of the same.

Figure 1:
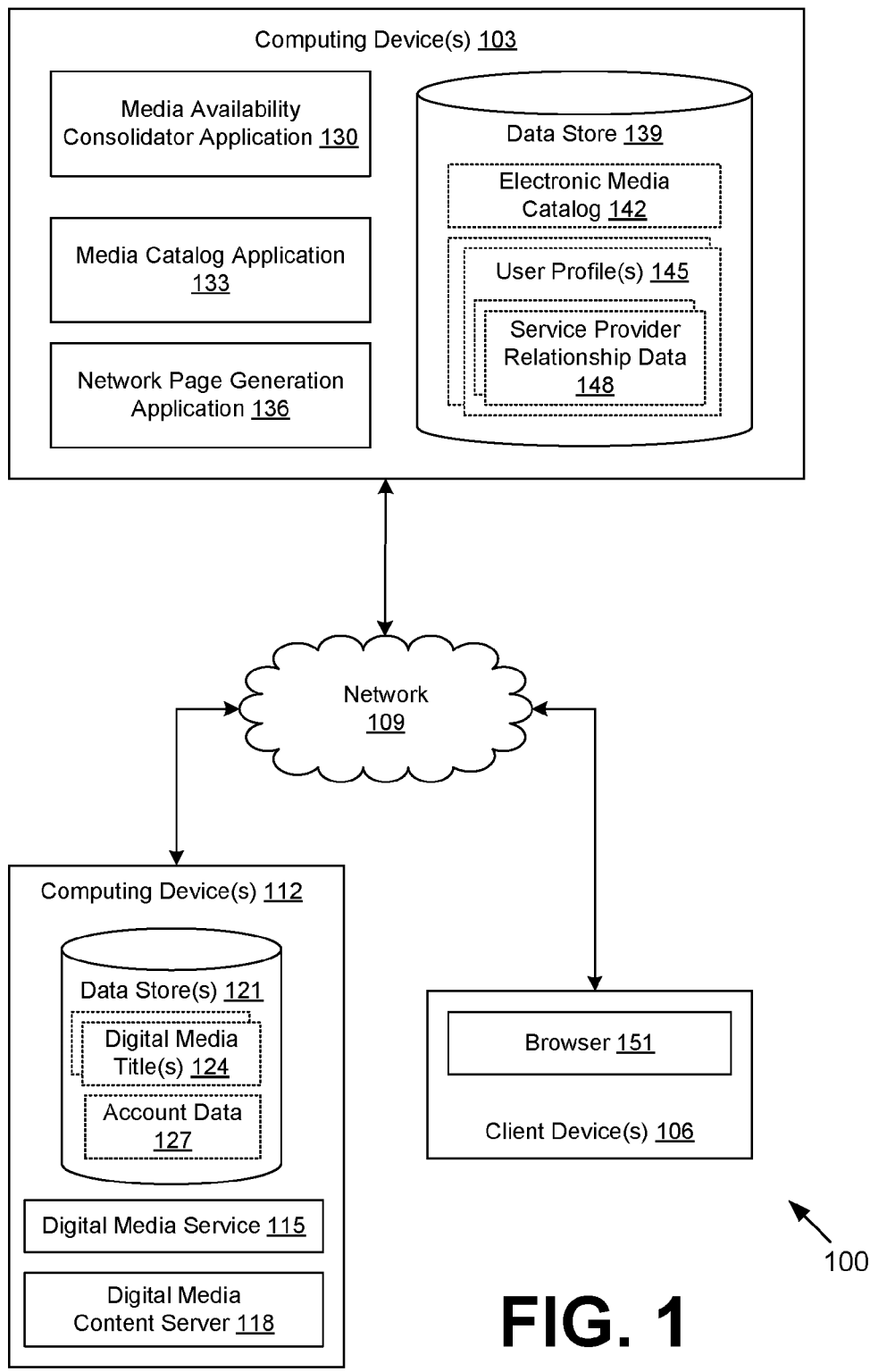
FIG. 1 is a drawing of a networked environment according to one embodiment of the present disclosure.

With reference to FIG. 1, shown is a networked environment 100 according to various embodiments. The networked environment 100 includes one or more computing devices 103 in data communication with one or more client devices 106 by way of a network 109. The computing device 103 is also in data communication with computing devices 112 by way of the network 109. The network 109 includes, for example, the Internet, intranets, extranets, wide area networks (WANs), local area networks (LANs), wired networks, wireless networks, or other suitable networks, or any combination of two or more such networks.

A computing device 103 may comprise, for example, a server computer or any other system providing computing capability. Alternatively, a plurality of computing devices 103 may be employed that are arranged, for example, in one or more server banks or computer banks or other arrangements. A plurality of computing devices 103 together may comprise, for example, a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though the computing device 103 is referred to in the singular, it is understood that a plurality of computing devices 103 may be employed in various arrangements.

A computing device 112 may comprise, for example, a server computer or any other system providing computing capability. Alternatively, a plurality of computing devices 112 may be employed that are arranged, for example, in one or more server banks or computer banks or other arrangements. A plurality of computing devices 112 together may comprise, for example, a cloud computing resource, a grid computing resource, and/or any other distributed computing arrangement. Such computing devices 112 may be located in a single installation or may be distributed among many different geographical locations. For purposes of convenience, the computing device 112 is referred to herein in the singular. Even though the computing device 112 is referred to in the singular, it is understood that a plurality of computing devices 112 may be employed in various arrangements.

Various applications and/or other functionality may be executed in a computing device 112 according to various embodiments. The components executed on the computing device 112 include, for example, a digital media service 115 and a digital media content server 118. The components executed on the computing device 112 may also include other applications, services, processes, systems, engines, or functionality not discussed in detail herein. These components may communicate with each other using various mechanisms, including but not limited to any type of middleware framework. Although the digital media service 115 is shown as logically separate from the digital media content server 118 in the example embodiment of FIG. 1, in other embodiments these components may be integrated, as should be appreciated.

Also, various data is stored in a data store 121 that is accessible to the computing device 112. The data store 121 may be representative of a plurality of data stores as can be appreciated. The data stored in the data store 139, for example, is associated with the operation of the various applications and/or functional entities of the computing device 112 as described herein. The data stored in the data store 121 includes, for example, digital media titles 124, account data 127, and potentially other data.

The digital media services 115 are operated by various digital media service providers. Each digital media service 115 provides a service which allows users to view digital media titles 124 stored in data store 121. The digital media titles 124 may include, for example, music, video, audio, podcasts, software, electronic games, or any other type of digital content. A digital media service provider uses a digital media service 115 operating on a computing device 112 to implement the service. As used below, the term "provider" refers to the entity and the term "service" refers to the implementing software.

Each digital media service 115 may provide an electronic marketplace or storefront through which users browse, search for, and/or select digital media titles 124 for contemporaneous or future consumption. At least some of these users have an ongoing relationship with a digital media service 115 and the digital media service 115 may store information describing the relationship between a particular user and the service as account data 127 in the data store 121. The account data 127 describes the terms and conditions of the user's relationship, for example, the type of access granted to the user, the number of titles which a user may access in a given time period, etc. Once a user has selected a particular digital media title 124 through interaction with the digital media service 115, the digital media content server 118 executes to supply the digital media title 124 to a client device 106 in data communication with the digital media content server 118 through the network 109.

Various applications and/or other functionality may be executed in the computing device 103 according to various embodiments. The components executed on the computing device 103 include, for example, a media availability consolidator application 130, a media catalog application 133, and a network page generation application 136. The components executed on the computing device 103 may also include other applications, services, processes, systems, engines, or functionality not discussed in detail herein. These components may communicate with each other using various mechanisms, including but not limited to any type of middleware framework. Although the media availability consolidator application 130, the media catalog application 133, and the network page generation application 136 are shown as separate components in the example embodiment of FIG. 1, in other embodiments these components may be integrated, as should be appreciated.

Also, various data is stored in a data store 139 that is accessible to the computing device 103. The data store 139 may be representative of a plurality of data stores as can be appreciated. The data stored in the data store 139, for example, is associated with the operation of the various applications and/or functional entities of the computing device 103 as described herein. The data stored in the data store 139 includes, for example, an electronic media catalog 142, user profiles 145, service provider relationship data 148, and potentially other data.

The media availability consolidator application 130 is executed to discover whether a specific digital media title 124 is available from multiple digital media service providers, and to present a consolidated view of this availability information to a user upon request. To this end, the media availability consolidator application 130 can generate one or more user interfaces through which a user can view the availability information. The availability information is customized for the user in that it takes into account which digital media service providers the user has a relationship with, the type of relationship, and the features associated with the relationship (e.g., features associated with a "premium" membership as compared to a "basic" membership). This information about the relationship between a particular user and a particular digital media service provider is stored as service provider relationship data 148, as part of a user profile 145, in the data store 139. Other user-specific information may also be stored in a user profile 145. For example, the user profile 145 may store information about which media formats are acceptable or preferable to the user, information about transmission speeds which are acceptable or preferable to the user, and information about one or more media player devices through which a user consumes digital media titles 124.

The media catalog application 133 is executed in order to facilitate the online viewing of the electronic media catalog 142 over the network 109. For example, the media catalog application 133 may provide content which allows the user to locate digital media titles 124 by navigating or browsing through the hierarchy of the electronic media catalog 142, and may also provide content in response to user queries about digital media titles 124 in the electronic media catalog 142. The electronic media catalog 142 includes at least a subset of electronic media catalog 142 which are available for consumption from the various digital media service providers.

The network page generation application 136 is executed to fetch network pages in response to requests from a client device 106. In some embodiments, the network page generation application 136 is a web server which is executed to fetch web pages generated by the media availability consolidator application 130 or the media catalog application 133. The network pages fetched by the network page generation application 136 may be dynamically generated or may be static. The network page generation application 136 uses various forms of network page data, which may include any type of data related to the generation of network pages. Such data may include, for example, templates, executable code, interpreted code, hypertext markup language (HTML), extensible markup language (XML), images, video, text, graphics, and any other type of data that may be used in network pages. The network page generation application 136 may include a network page server and/or other components. The network page server may comprise a commercially available hypertext transfer protocol (HTTP) server such as, for example, Apache® HTTP Server, Microsoft® Internet Information Services (IIS), and other servers.

Having discussed the computing device 103 and the computing device 112, the client device 106 will now be considered. The client device 106 is representative of a plurality of client devices that may be coupled to the network 109. The client device 106 may comprise, for example, a processor-based system such as a computer system. Such a computer system may be embodied in the form of a desktop computer, a laptop computer, a personal digital assistant, a cellular telephone, a smartphone, a set-top box, a television, a music player, a video player, a media player, a web pad, a tablet computer system, a game console, an electronic book reader, or other devices with like capability. The client device 106 may be configured to execute various applications such as a browser 151. The browser 151 may be executed in the client device 106, for example, to access and render network pages, such as web pages, or other network content served up by the computing device 103 and/or other servers, thereby generating a rendered content page on a display of the client device 106. The client device 106 may be configured to execute applications beyond the browser 151 such as, for example, email applications, messaging applications, and/or other applications.

Next, a general description of the operation of the various components of the networked environment 100 is provided. To begin, a user establishes a relationship with multiple digital media service providers by, for example, becoming a subscriber and creating an account with several of the digital media service providers. The term "subscription" is not limited to a paid model: a user may be charged a fee for the subscription, or the subscription may be at no cost. Having established relationships with various digital media service providers, the user interacts with an application on a client device 106, for example, a browser 151, to discover which digital media service providers can supply a particular digital media title 124 for viewing, as follows.

As noted above, the user may use the browser 151 to interact with the media catalog application 133 to navigate through digital media titles 124 or to search for a particular digital media title 124. Once the user has identified a specific digital media title 124 through navigation or search, the media availability consolidator application 130 identifies those digital media service providers with which the user has a relationship. The media availability consolidator application 130 then determines whether the digital media title 124 is available for viewing from each provider of the user-specific subset of digital media service providers. Some or all of the availability information collected by the media availability consolidator application 130 is then provided through a user interface which presents the user with a consolidated view of the title's availability from different digital media service providers. The user interface may be generated, for example, by the media availability consolidator application 130.

The availability information presented to the user takes into account information about the user's relationship with each of these digital media service providers. Thus, for example, if a given digital media title 124 is available only to "premium" subscribers of the Zulu service but the user has a subscription to the "basic" service, then the media availability consolidator application 130 may indicate that the digital media title 124 is unavailable from Zulu. Alternatively, in the same scenario the media availability consolidator application 130 may indicate that the digital media title 124 is not available with the user's current "basic" service, but is available if the user upgrades to "premium."

In some embodiments, the media availability consolidator application 130 also provides availability information for digital media service providers with which the user does not have a preexisting relationship. For example, if a given digital media title 124 is available from Zulu and from Flicks but the user subscribes only to Flix, the media availability consolidator application 130 provides availability information for Zulu as well as Flicks. In some of these embodiments, the media availability consolidator application 130 further presents to the user information about how to establish a relationship with a digital media service provider with which the user does not have an existing relationship. For example, the media availability consolidator application 130 may present a hyperlink to a network page on a network site operated by the digital media service provider. Continuing with the example above, a user without an existing relationship with Zulu may be given information about the Zulu subscription, information about how to become a Zulu subscriber, and/or an opportunity to become a Zulu subscriber, for example through a link to the digital media service 115 for Zulu.

Figure 2:
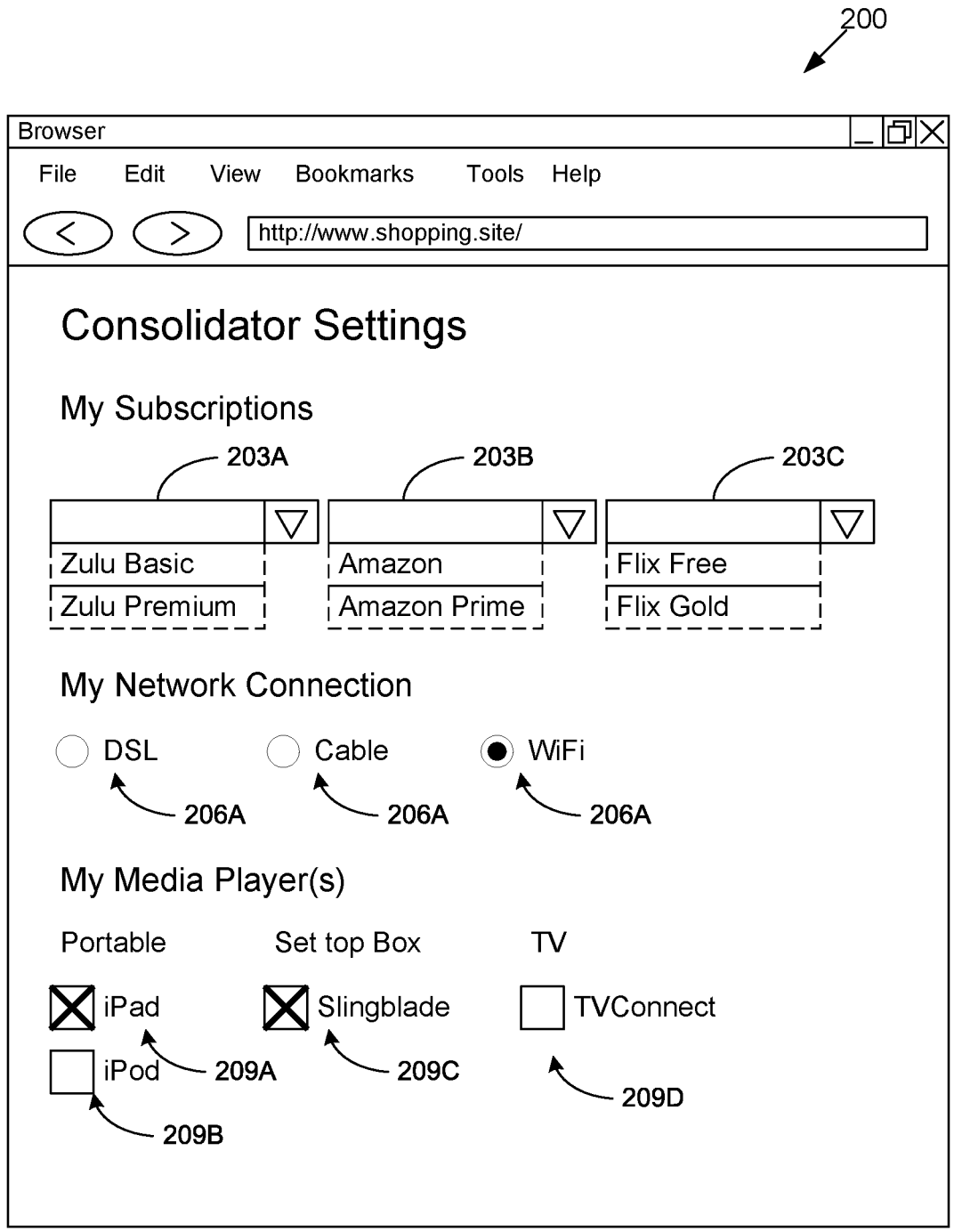
FIG. 2 is an example user interface that can be generated by the computing device in the networked environment of FIG. 1 according to various embodiments of the present disclosure.

Reference is now made to FIG. 2, which illustrates an example configuration user interface 200 that can be generated by the media availability consolidator application 130 according to various embodiments of the disclosure. The configuration user interface 200 is rendered on a client device 106 (FIG. 1) in the networked environment 100 (FIG. 1) according to various embodiments of the disclosure. In some embodiments, the configuration user interface 200 takes the form of a network page which is rendered by a browser 151 executing in the client device 106, but other types of user interfaces may be used as can be appreciated.

The configuration user interface 200 allows the user to provide user-specific information for use by the media availability consolidator application 130. More specifically, the configuration user interface 200 allows the user to specify the digital media service providers with which he has a relationship, as well as the type of account or relationship for each provider. The configuration user interface 200 also allows the user to describe the media player device(s) which will be used to consume the digital media titles 124 and to describe other aspects of the user's configuration such as the type of network connection. The information provided through the configuration user interface 200 to the media availability consolidator application 130 is stored as a user profile 145 in the data store 139.

As can be seen in FIG. 2, the configuration user interface 200 includes a set of controls 203 that relate to the user's digital media service providers. In this example, the controls 203 are implemented with combo boxes 203A-C, allowing the user to choose one or more of the following digital media service providers: Zulu, Amazon, and Flicks. More specifically, the user can choose between "Zulu Basic" and "Zulu Premium," between "Amazon" and "Amazon Prime," and between "Flix Free" and "Flix Gold." The configuration user interface 200 also includes a set of controls 206 that relate to the user's media player devices. In this example, the controls 206 are implemented with check boxes 206A-D, allowing the user to choose one or more of "iPad," "iPod," the set top box "Slingblade," and the television "TVConnect." Finally, the configuration user interface 200 includes a set of controls 209 that describe the network connection between the client device 106 and the network 109. In this example, the controls 209A-C allow the user to choose between "DSL," "Cable," and "WiFi."

The user interface 200 may also allow the user to provide authentication credentials associated with each of the selected digital media service providers. The media availability consolidator application 130 may then use the authentication credentials to log in to the corresponding digital media service provider in order to obtain availability information from that provider. In some embodiments, this log in may be performed automatically during the process of obtaining availability information. In some embodiments, this log in may be performed automatically during the process of providing the user with access to the digital media title of interest.

In some embodiments, the user has control over the automatic log in process on a per-provider basis, by specifying which providers are automatically logged into and which are not. This level of control may be desirable, for example, to a user who is not comfortable sharing authentication credentials with the media availability consolidator application 130.

In some scenarios, an attempt by the media availability consolidator application 130 to log in to a particular digital media service provider on behalf of the user may fail. In some embodiments, when the log in fails, then the media availability consolidator application 130 requests that the user provide the availability consolidator application 130 with updated authentication information.

The media availability consolidator application 130 queries the configuration user interface 200 to determine the settings chosen by the user. The information may be processed, analyzed, or converted before storage in a user profile 145 that is specific to the user. The media availability consolidator application 130 may use various mechanisms to determine the identity of the particular user associated with the configuration, for example, through a user login process, through persistent state information, or other mechanisms as may be appreciated.

Figure 3:
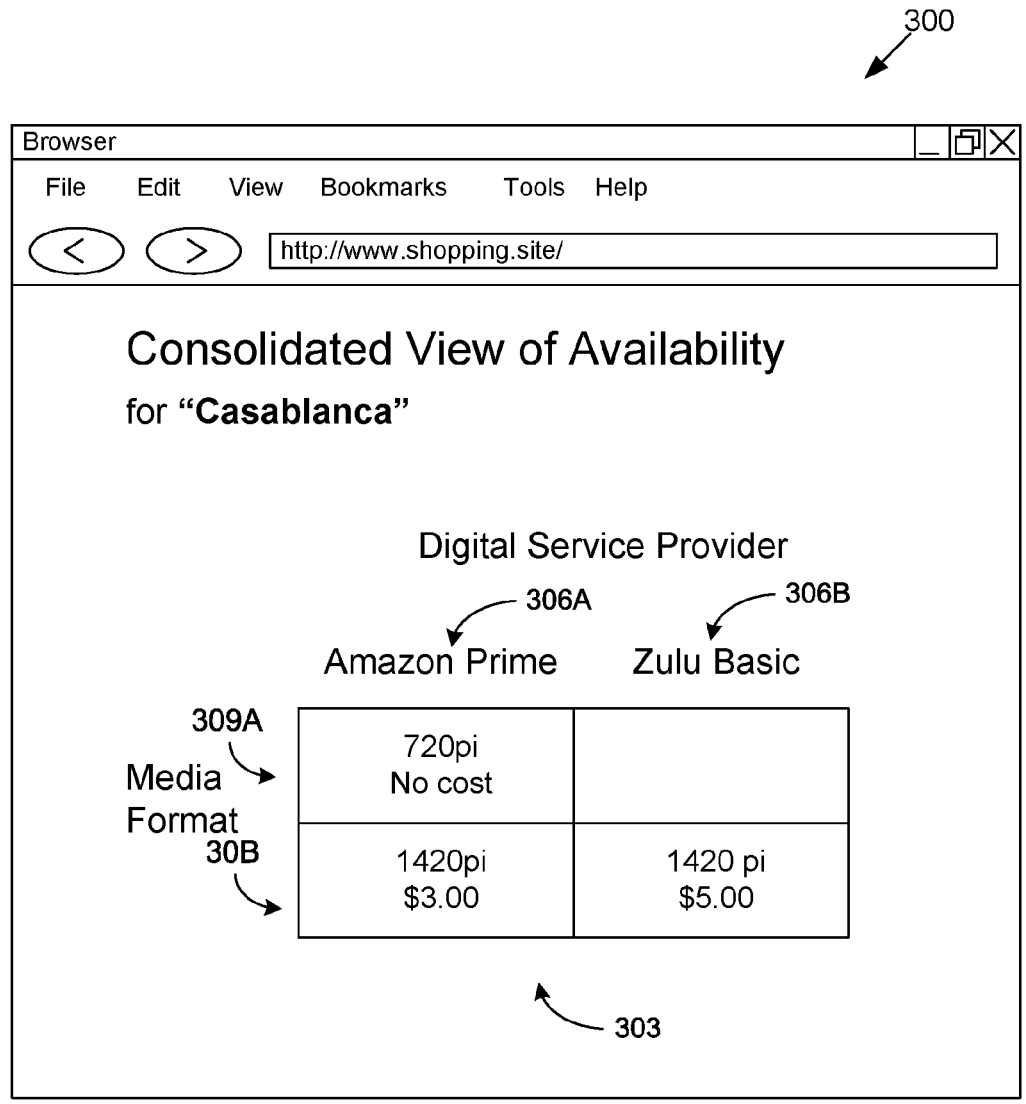
FIG. 3 is an example of another user interface that can be generated by the computing device in the networked environment of FIG. 1 according to various embodiments of the present disclosure.

Moving on to FIG. 3, shown is an example media title availability user interface 300 that can be generated by the media availability consolidator application 130 according to various embodiments of the disclosure. The media title availability user interface 300 is rendered on a client device 106 (FIG. 1) in the networked environment 100 (FIG. 1) according to various embodiments of the disclosure. In some embodiments, the media title availability user interface 300 takes the form of a network page which is rendered by a browser 151 executing in the client device 106, but other types of user interfaces may be used as can be appreciated.

As can be seen in FIG. 3, the media title availability user interface 300 includes a matrix 303 which displays the availability of a given digital media title 124 from various digital media service providers. Each column 306 represents a different digital media service provider with which the user has a relationship, while each row 309 represents a different media format. In this example, the media formats correspond to screen resolution, but other user interfaces 300 may represent media format in a different way, for example, file format, transfer rate, etc. In the example shown in FIG. 3, the matrix 303 shows that the digital media title 124 ("Casablanca") is available for viewing by the user from two different digital media service providers. The title is available from Amazon Prime in two resolutions: 720 vertical bits progressive (720 pi), at no cost; and 1420 vertical bits progressive (1420 pi) at a cost of $3.00. The digital media title 124 is also available from Zulu Basic in one resolution: 1420 vertical bits progressive (1420 pi) at a cost of $5.00.

In some embodiments, the user can click on a cell of the matrix 303 in order to consume the digital media title 124 from the corresponding digital media service provider. The media availability consolidator application 130 then interacts with the digital media service 115 in order to facilitate the consumption transaction. If the access type for the selected cell is streaming, the user may begin viewing the digital media title 124 substantially immediately. If the access type is instead download, the download may start substantially immediately, but the user may be required to defer viewing until the download is partially or completely finished. In some embodiments, clicking on a cell to request consumption takes the user to another network page, hosted by a system operated by the digital media service provider, such as the digital media service 115. At that network page, the user may be requested to enter account and/or payment information. In other embodiments, the account and/or payment information is provided to the digital media service 115 in a transparent manner by the media availability consolidator application 130.

Figure 4:
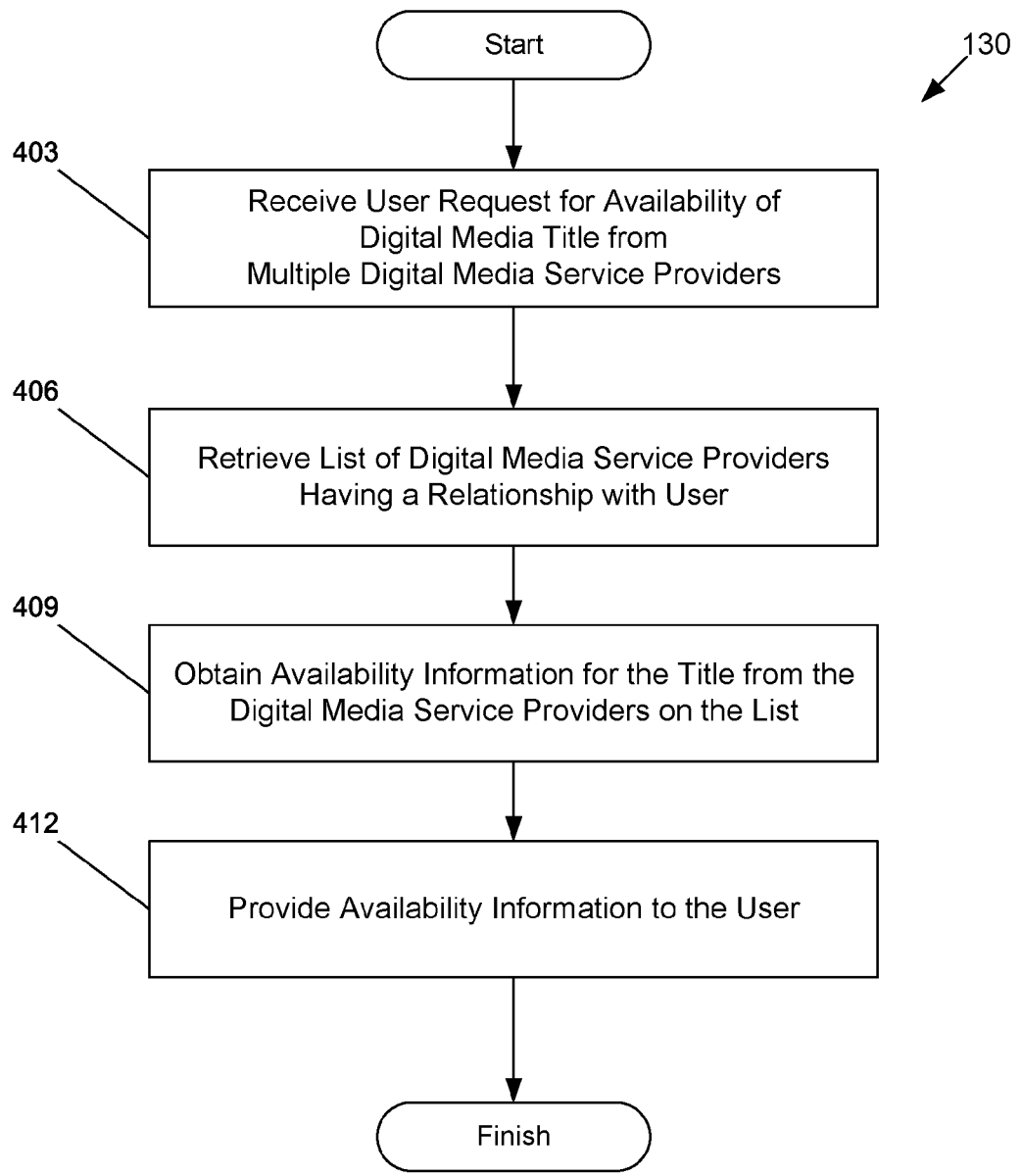
FIG. 4 is a flowchart illustrating an example of functionality implemented as portions of a media availability consolidator application executed in a computing device in the networked environment of FIG. 1 according to various embodiments of the present disclosure.

Turning now to FIG. 4, shown is a flowchart that provides one example of the operation of portion(s) of the media availability consolidator application 130 according to various embodiments. It is understood that the flowchart of FIG. 4 provides merely an example of the many different types of functional arrangements that may be employed to implement the operation of portion(s) of the media availability consolidator application 130 as described herein. As an alternative, the flowchart of FIG. 4 may be viewed as depicting an example of steps of a method implemented in the computing device 103 (FIG. 1) according to one or more embodiments.

Beginning at box 403, the media availability consolidator application 130 receives a user request for the availability of a particular digital media title 124 from multiple digital media service providers. The availability is specific to the user. That is, the request is not a general request as to whether or not the digital media title 124 is available for viewing from various digital media service providers, but instead takes into account the user's preexisting association with those digital media service providers. Therefore, at box 406, the media availability consolidator application 130 retrieves a list of digital media service providers with which the user has a preexisting relationship. This relationship may be, for example, a customer relationship, a subscriber relationship, or other types of preexisting relationships. The media availability consolidator application 130 may also retrieve other information that describes the level of, or types of, viewing access that the user has with each of these digital media service providers. For example, a service provider may offer a "basic" service that allows five downloads per month and a "premium" service that allows ten downloads per month. As another example, a service provider may offer a "slow" service that supports relatively low download speeds and a "fast" service that supports relatively high download speeds.

Having obtained information about which digital media service providers the user has a relationship with, and possibly additional information about viewing/access features associated with the user-provider relationship, at box 409, the media availability consolidator application 130 obtains information describing availability of the digital media title 124 from these digital media service providers. In some embodiments, the media availability consolidator application 130 obtains the availability information through a web service, application program interface (API), or other programmatic interface supported by a digital media service provider. In other embodiments, the media availability consolidator application 130 obtains the availability information by visiting a network site operated by the digital media service provider, retrieving network page(s), and analyzing the page content to determine availability of the specific digital media title 124.

The availability information may include, for example: a fee charged for user access to the digital media title 124; the type of access (e.g., download, streaming, real-time streaming, etc.); the file format, stream format, and/or encoding format; the transfer bit rate; screen resolution; and other types of information describing the user's ability to view or access the digital media title 124 from a particular digital media service provider. The availability information obtained from a given digital media service provider may include multiple availability instances. For example, a particular digital media service provider may offer two options for viewing the digital media title 124 (e.g., a high-resolution option and a low resolution option). In such a case, the information obtained at box 409 would describe both options.

In some embodiments, when the media availability consolidator application 130 requests availability information for a particular digital media service provider, the media availability consolidator application 130 identifies the user and/or the type of user-provider relationship so that digital media service provider can take into account the specific relationship when providing title availability information. For example, if the user has a "premium" relationship, the digital media service provider may provide only information about the availability of the title to "premium" users.

However, some digital media service provider may not provide this level of detail or specificity with regard to title availability. Therefore, in some embodiments, the availability information provided by a digital media service provider is not specific to a user or class of users, but instead represents the availability of the title generally. In such cases, the media availability consolidator application 130 may further process the availability information obtained at box 409 from one or more of the digital media service providers in order to determine the availability of the digital media title 124 to the specific user. For example, the media availability consolidator application 130 may discover through the user profile that the user has a "premium" relationship with the digital media service provider and may therefore discard or ignore any information provided by the digital media service provider for availability to other types of users.

Next, at box 412, the media availability consolidator application 130 provides to the user some or all of the information describing availability of the digital media title 124 from the digital media service providers. The availability information may be provided, for example, in the form of a network page for rendering by a browser 151 executing on the client device 106. In some embodiments, availability information from all of the digital media service providers with which the user has a relationship is presented. Various examples of availability information were described above, and the presentation to the user may be made through a user interface such as media title availability user interface 300 (FIG. 3). Having provided the availability information to the user, the process of FIG. 4 is then complete.

Figure 5:
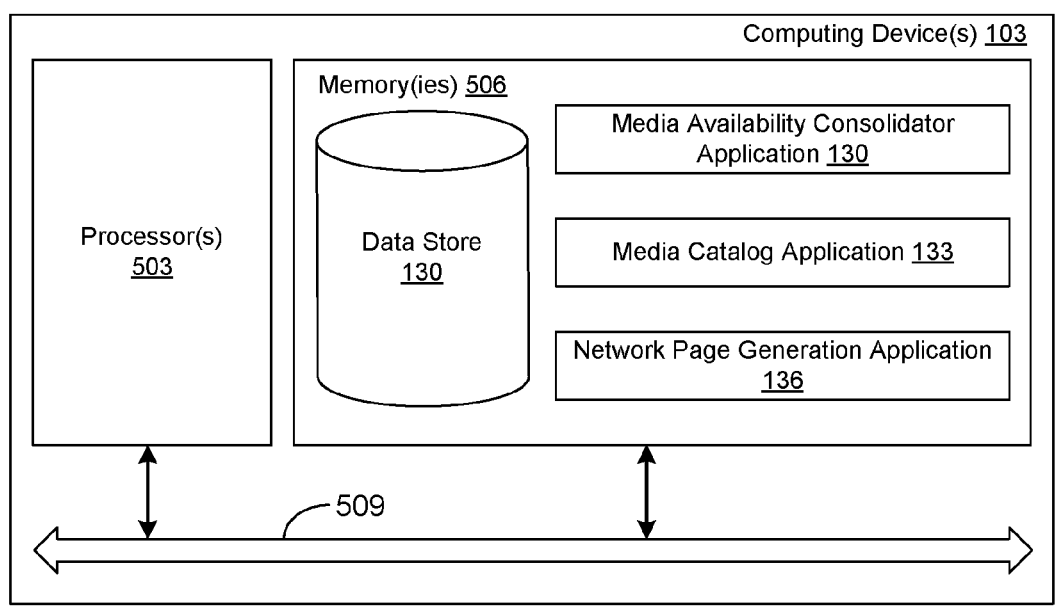
FIG. 5 is a schematic block diagram that provides one example illustration of a computing device employed in the networked environment of FIG. 1 according to various embodiments of the present disclosure.

With reference now to FIG. 5, shown is a schematic block diagram of the client device 106 according to an embodiment of the present disclosure. The computing device 103 includes at least one processor circuit, for example, having a processor 503 and a memory 506, both of which are coupled to a local interface 509. To this end, the computing device 103 may comprise, for example, at least one server computer or like device. The local interface 509 may comprise, for example, a data bus with an accompanying address/control bus or other bus structure as can be appreciated.

Stored in the memory 506 are both data and several components that are executable by the processor 503. In particular, stored in the memory 506 and executable by the processor 503 are the media availability consolidator application 130, the media catalog application 133, and the network page generation application 136. In addition, an operating system may be stored in the processor 503 and executable by the processor 503. While not illustrated, the computing device 112 (FIG. 1) also includes components like those shown in FIG. 5, whereby the digital media service 115 (FIG. 1) and the digital media content server 118 (FIG. 1) are stored in a memory and executable by a processor. Similarly, the client device 106 (FIG. 1) also includes components like those shown in FIG. 5, whereby the browser 151 (FIG. 1) is stored in a memory and executable by a processor.

It is understood that there may be other applications that are stored in the memory 506 and are executable by the processor 503 as can be appreciated. Where any component discussed herein is implemented in the form of software, any one of a number of programming languages may be employed such as, for example, C, C++, C#, Objective C, Java, JavaScript, Perl, PHP, Visual Basic, Python, Ruby, Delphi, Flash, or other programming languages.

A number of software components are stored in the memory 506 and are executable by the processor 503. In this respect, the term "executable" means a program file that is in a form that can ultimately be run by the processor 503. Examples of executable programs may be, for example, a compiled program that can be translated into machine code in a format that can be loaded into a random access portion of the memory 506 and executed by the processor 503, source code that may be expressed in proper format such as object code that is capable of being loaded into a random access portion of the memory 506 and executed by the processor 503, or source code that may be interpreted by another executable program to generate instructions in a random access portion of the memory 506 and executed by the processor 503, etc. An executable program may be stored in any portion or component of the memory 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 506 is defined herein as including both volatile and nonvolatile memory and data storage components. Volatile components are those that do not retain data values upon loss of power. Nonvolatile components are those that retain data upon a loss of power. Thus, the memory 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 503 may represent multiple processors and the memory 506 may represent multiple memories that operate in parallel processing circuits, respectively. In such a case, the local interface 509 may be an appropriate network 109 (FIG. 1) that facilitates communication between any two of the multiple processors 503, between any of the processors 503 and any of the memories 506, or between any two of the memories 506, etc. The local interface 509 may comprise additional systems designed to coordinate this communication, including, for example, performing load balancing. The processor 503 may be of electrical or of some other available construction.

Although the media availability consolidator application 130, the media catalog application 133, and the network page generation application 136 and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowchart of FIG. 4 shows the functionality and operation of an implementation of portions of the media availability consolidator application 130. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as one of the processors 503 in a computer system or other system. The machine code may be converted from the source code, etc. If embodied in hardware, each block may represent a circuit or a number of interconnected circuits to implement the specified logical function(s).

Although the flowchart of FIG. 4 shows a specific order of execution, it is understood that the order of execution may differ from that which is depicted. For example, the order of execution of two or more blocks may be scrambled relative to the order shown. Also, two or more blocks shown in succession in the flowchart of FIG. 4 may be executed concurrently or with partial concurrence. Further, in some embodiments, one or more of the blocks shown in the flowchart of FIG. 4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein (including the media availability consolidator application 130, the media catalog application 133, and the network page generation application 136) that comprises software or code can be embodied in any non-transitory computer-readable medium for use by or in connection with an instruction execution system such as, for example, the processor 503 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A computer-implemented method comprising:
receiving, via at least one computing device, a request from a client device for availability of a specified digital media title;
selecting, via the at least one computing device, a plurality of digital media service providers with which a user account indicates a relationship exists;
obtaining, via the at least one computing device, information describing availability of the specified digital media title from at least two of the selected plurality of digital media service providers;
retrieving, via the at least one computing device, relationship information specific to the user account associated with the client device and to at least two of the selected plurality of digital media service providers;
determining, via the at least one computing device, whether the specified digital media title is accessible by the client device from the at least two of the selected plurality of digital media service providers based at least in part on the information describing availability and on the relationship information;
preparing, via the at least one computing device, information about accessibility of the specified digital media title by the client device from at least a subset of the selected plurality of digital media service providers; and
sending, via the at least one computing device, the information about access to the client device.

2. The computer-implemented method of claim 1, wherein the subset of the selected plurality of digital media service providers comprises at least two digital media service providers.

3. The computer-implemented method of claim 1, further comprising:
obtaining second information describing availability of the specified digital media title from another digital media service provider with which the user account does not indicate a customer relationship exists; and
determine whether the specified digital media title is also accessible by the client device from the another digital media service provider based at least in part on the second information describing availability.

4. The computer-implemented method of claim 1, further comprising selecting, via the at least one computing device, at least one additional digital media service provider with which the user account does not indicate a relationship exists; and obtaining, via the at least one computing device, information describing availability of the specified digital media title from the at least one additional digital media service provider.

5. The computer-implemented method of claim 1, further comprising receiving an authentication credential that identifies the relationship identified in the user account with one of the plurality of digital media service providers, wherein determining whether the specified digital media title is accessible by the client device comprises authenticating with the one of the plurality of digital media service providers using the authentication credential.

6. The computer-implemented method of claim 1, wherein the information describing the availability of the specified digital media title is based at least in part on a type of relationship the user account indicates with the at least two of the selected plurality of digital media service providers.

7. The computer-implemented method of claim 1, wherein the information describing the availability of the specified digital media title is based at least in part on a type of relationship with the at least two of the selected plurality of digital media service providers.

8. The computer-implemented method of claim 1, wherein the relationship information comprises a feature of one of the selected plurality of digital media service providers, and determining whether the specified digital media title is accessible by the client device is based at least in part on the feature.

9. A system comprising:
a data store comprising relationship information specific to a user account for a plurality of digital media service providers; and
at least one computing device in communication with the data store, the at least one computing device being configured to at least:
receive a request from a client device for availability of a specified digital media title;
select a plurality of selected digital media service providers based at least in part on the relationship information;
obtain information describing availability of the specified digital media title from at least two of the selected plurality of digital media service providers;
determine whether the specified digital media title is accessible by the client device from the at least two of the selected plurality of digital media service providers based at least in part on the information describing availability and on the relationship information;
prepare information about accessibility of the specified digital media title by the client device from at least a subset of the selected plurality of digital media service providers; and
send the information about accessibility to the client device.

10. The system of claim 9, wherein the at least one computing device is further configured to at least:
receive the relationship information from the client device; and
store the relationship information in the data store.

11. The system of claim 9, wherein the information about accessibility of the specified digital media title includes at least one of: a fee for the access to the specified digital media title, a parameter specifying a media format of the digital media title, a parameter specifying a resolution of the digital media title, or a parameter specifying a transfer bitrate of the digital media title.

12. The system of claim 9, wherein the at least one computing device is further configured to at least request an update to an authentication credential in response to a failure to authenticate an existing authentication credential with one of the plurality of digital media service providers.

13. The system of claim 9, wherein the at least one computing device is further configured to at least:
generate a configuration user interface;
receive information describing an existing relationship with a first digital media service provider of the plurality of digital media service providers via the configuration user interface; and
store the information describing the existing relationship in the data store associated with the user account.

14. The system of claim 13, wherein the configuration user interface is configured to receive an authentication credential that identifies the existing relationship between the user account and the first digital media service provider, and the at least one computing device is further configured to at least use the authentication credential to log in to the first digital media service provider.

15. A system comprising:
at least one computing device; and
a media application that, when executed by the at least one computing device, causes the at least one computing device to at least:
receive a request from a client device for availability of a specified digital media title by the client device;
select a plurality of digital media service providers with which the user account indicates a relationship exists;
obtain information describing availability of the specified digital media title from at least two of the selected plurality of digital media service providers;
retrieve relationship information specific to the user account and to at least two of the selected plurality of digital media service providers;
determine that the specified digital media title is accessible by the client device from the at least two of the selected plurality of digital media service providers based at least in part on the information describing availability and on the relationship information;
prepare information about accessibility of the specified digital media title from the at least two of the selected plurality of digital media service providers; and
send the information about access to the client device.

16. The system of claim 15, wherein the at least one computing device is further configured to at least cause the information about access to be rendered by the client device.

17. The system of claim 15, wherein sending the information about access to the client device comprises sending data encoding a hyperlink to a network page.

18. The system of claim 15, wherein the information about the accessibility of the specified digital media title is limited to those of the selected plurality of digital media service providers for which the specified digital media title is accessible.

19. The system of claim 15, wherein the at least one computing device is further configured to at least:
obtain second information describing availability of the specified digital media title from another digital media service provider with which the user account does not indicate a customer relationship exists; and determine whether the specified digital media title is also accessible from the another digital media service provider based at least in part on the second information describing availability.

20. The system of claim 15, wherein the at least one computing device is further configured to at least:

obtain at least part of the information describing availability of the specified digital media title from a network site associated with at least one of the selected plurality of digital media service providers; and analyze the information to describing availability to determine whether the specific digital media title is accessible for consumption by the client device.

* * * * *

UNITED STATES PATENT AND TRADEMARK OFFICE
CERTIFICATE OF CORRECTION

PATENT NO.         : 10,162,979 B2                                    Page 1 of 1
APPLICATION NO.    : 15/727657
DATED              : December 25, 2018
INVENTOR(S)        : Barrilleaux et al.

It is certified that error appears in the above-identified patent and that said Letters Patent is hereby corrected as shown below:

In the Claims

Column 9, Line 45: "client device 106" should be changed to --computing device 103--

Signed and Sealed this
Fifth Day of November, 2019

Andrei Iancu
*Director of the United States Patent and Trademark Office*